US008581898B2

(12) United States Patent
Lee

(10) Patent No.: US 8,581,898 B2

(45) Date of Patent: Nov. 12, 2013

(54) DISPLAY DEVICE AND COMPENSATING METHOD THEREOF

(75) Inventor: I-Shu Lee, Taoyuan (TW)

(73) Assignee: Au Optronics Corporation, Hsinchu (TW)

( * ) Notice: Subject to any disclaimer, the term of this patent is extended or adjusted under 35 U.S.C. 154(b) by 526 days.

(21) Appl. No.: 12/349,271

(22) Filed: Jan. 6, 2009

(65) Prior Publication Data

US 2009/0115770 A1 May 7, 2009

Related U.S. Application Data

(62) Division of application No. 11/115,488, filed on Apr. 26, 2005, now Pat. No. 7,515,148.

(30) Foreign Application Priority Data

Dec. 24, 2004 (TW) ............................... 93140413 A

(51) Int. Cl.

*G06F 3/038* (2013.01)

(52) U.S. Cl.

USPC .............. 345/212; 345/211; 345/204; 345/76

(58) Field of Classification Search

USPC .................................... 345/76–100, 204–212

See application file for complete search history.

(56) References Cited

U.S. PATENT DOCUMENTS

| | | | | |
|---|---|---|---|---|
| 6,753,654 | B2 * | 6/2004 | Koyama | 315/169.1 |
| 2002/0180672 | A1 * | 12/2002 | Yamazaki et al. | 345/77 |
| 2004/0100463 | A1 * | 5/2004 | Miyagawa et al. | 345/212 |

* cited by examiner

*Primary Examiner* — Christopher E Leiby

(74) *Attorney, Agent, or Firm* — J.C. Patents

(57) ABSTRACT

A display device includes a display panel, a gate driver circuit, a source driver circuit, a timing control circuit, current detection circuits, and a programmable voltage generator. The display panel includes display pixel cells and redundancy pixel cells. The gate driver circuit is connected to the display panel via scan lines. The source driver circuit is connected to the display panel via data lines. The timing control circuit is connected to the gate driver circuit, the source driver circuit and the display panel via at least one redundancy scan line. Each of the current detection circuits is adopted for detecting one of the redundancy pixel cells and a working current of one of the display pixel cells to be compensated respectively when the display device enters the compensation mode. The programmable voltage generator is connected to the timing control circuit and the source driver circuit.

9 Claims, 7 Drawing Sheets

DISPLAY DEVICE AND COMPENSATING METHOD THEREOF

CROSS-REFERENCE TO RELATED APPLICATION

This application is a divisional of, and claims the priority benefit of the application Ser. No. 11/115,488, filed on Apr. 26, 2005, now pending. The parent application also claims the priority benefit of Taiwan application serial no. 93140413, filed on Dec. 24, 2004. The entirety of each of the above-mentioned patent applications is hereby incorporated by reference herein and made a part of this specification.

BACKGROUND OF THE INVENTION

1. Field of the Invention

The present invention relates to a detection method of a display device. More particularly, the present invention relates to detection method of a display device including pixel devices constructed by organic light emitting diode.

2. Description of Related Art

With the rapid advancement of multimedia technology, semiconductor component and display device technology have progressively developed. In the conventional flat display device, since thin film transistor active matrix organic light emitting diode (TFT-AMOLED) display has the advantages of free of view-angle dependence, low cost, high response speed (about hundreds of times compared to liquid crystal display device), low power consumption, portability, large operating temperature range, light weight and sizable for suiting thinner and miniature requirements, the TFT-AMOLED display can be readily applied in multimedia display device. Therefore, the TFT-AMOLED display has great potential and may be developed as the next generation flat panel display.

Conventionally, the process for manufacturing TFT-AMOLED display may be classified into two methods, one is low temperature polysilicon (LTPS TFT) technology, and the other is amorphous silicon TFT (a-Si TFT) technology. Table 1 listed below illustrates the comparison of the two technologies.

TABLE 1

| | LTPS TFT | a-Si TFT |
|---|---|---|
| Mobility | 50 to 200 | 0.5 to 1 |
| TFT Type | PMOS and NMOS | NMOS |
| TFT Uniformity | worse | better |
| Number of Process | 9 to 10 masking processes | 4 to 5 masking processes |
| cost (array only) | high | low |
| cost (panel module) | low (built-in driver) | high (external driver) |
| Equipment Investment | high | low |
| Yield | low | high |
| Overall Cost | cheaper in small size panel | cheaper in large size panel |
| Output Current Stability | high | low |
| OLED Degradation | not sensitive | sensitive |

As shown in table 1, it is noted that the uniformity of the TFT-AMOLED display manufactured by the LTPS TFT technology is not good, and the cost of LTPS TFT technology is high due to comparatively larger number of masking processes. Therefore, conventionally, the LTPS TFT technology is mainly adopted for small size panel, however, the a-Si TFT technology is provided for large size panel usually.

Although the cost for manufacturing the TFT-AMOLED display may be reduced by using a-Si TFT technology, however, the a-Si TFT has a variety of disadvantages. FIG. 1A is a plot illustrating the drain current (Id) and gate voltage (Vg) versus time of conventional a-Si TFT. As shown in FIG. 1A, the drain current Id of a-Si TFT will shift after working a period of time.

FIG. 1B and FIG. 1C are plots illustrating the comparison of properties between a-Si TFT and LTPS TFT. As shown in FIG. 1B, the horizontal axis represents time, and the vertical axis represents an output current value, wherein the LTPS TFT has a much better output current stability, however, the output current of the a-Si TFT decays after working for a period of time. In FIG. 1 C, the horizontal axis represents time, and the vertical axis represents brightness. It is noted that, the brightness of the AMOLED display manufactured by LTPS TFT technology is very stable even after working for a period of time since the output current stability of LTPS TFT technology is very good. However, the brightness AMOLED display manufactured by a-Si TFT technology decays after working for a period of time since the output current stability of a-Si TFT technology is poor. Therefore, how to compensate a-Si TFT technology to enhance the stability of the AMOLED display using a-Si TFT technology is very important.

SUMMARY OF THE INVENTION

Therefore, the present invention is directed to a pixel circuit of a display, wherein the output working current may be compensated.

In addition, the present invention is directed to a display panel, wherein the output current may be compensated according to a working current in the pixel cell.

Moreover, the present invention is directed to a display device, wherein the output current may be automatically compensated according to a working condition of each pixel cell.

Furthermore, the present invention is directed to a compensation method of a display device, suitable for amorphous silicon (a-Si TFT) AMOLED display, for stabilizing the output current of the pixel.

According to one embodiment of the present invention, a pixel circuit of a display comprising a plurality of scan lines and data lines is provided. The pixel circuit of the present invention may comprise, for example, a first transistor, a second transistor and a pixel device. The gate terminal of the first transistor may be connected to one of the scan lines, the first source/drain terminal of the first transistor may be connected to one of the data lines, and the second source/drain terminal of the first transistor may be connected to the gate terminal of the second transistor. In addition, the first source/drain terminal of the second transistor may be connected to a voltage source, and the second source/drain terminal may be connected to the pixel device. In one embodiment of the present invention, the pixel circuit of the present invention may further comprise a current mirror module and a switching device. The current mirror module may comprise a current input terminal and a current output terminal, wherein the current input terminal may be connected to the second source/drain terminal of the second transistor via the pixel device, and is suitable for duplicating a first current through the pixel device to the current output terminal. The switching device may be adopted for deciding whether or not to output a second current from the current output terminal according to a select signal, and the second current is compared with a reference current.

In one embodiment of the present invention, the current mirror module may comprise a third transistor and a fourth transistor. The first source/drain terminal of the third transistor may be connected to the current input terminal, and a second source/drain terminal of the third transistor is grounded. The first source/drain terminal of the fourth transistor is connected to the current output terminal, a second source/drain terminal of the fourth transistor is grounded, and gate terminal of the fourth transistor is connected to the gate terminal and the first source/drain terminal of the third transistor.

In one embodiment of the present invention, the switching device may comprise a switching transistor, wherein a gate terminal of the switching transistor receives the select signal, and a first source/drain terminal of the switching transistor is connected to a drain terminal of the fourth transistor, the switching transistor decides whether to turn on the first source/drain terminal and the second source/drain terminal of the switching transistor or not according to the select signal.

In one embodiment of the present invention, the second source/drain terminal of the first transistor may be grounded via a capacitor.

In one embodiment of the present invention, the pixel device may comprise organic light emitting diode (OLED). The anode terminal of the OLED may be connected to the source terminal of the second transistor, and the cathode terminal of the OLED may be connected to a current input terminal of the current mirror (e.g., the drain terminal of the third transistor). In addition, the first transistor and the second transistor may comprise (a-Si TFT).

According to one embodiment of the present invention, a display panel is provided. The display panel may comprise, for example, a plurality of scan lines disposed parallel to each other in a first direction; at least one redundancy scan line disposed parallel to the scan lines; a plurality of data lines disposed parallel to each other in a second direction crossing over the redundancy scan line and the scan lines; a plurality of display pixel circuits disposed at a plurality of cross over points of the data lines and the scan lines, wherein whether or not to turn on the display pixel circuits is decided by the scan signal; and a plurality of redundancy pixel circuits disposed at a plurality of points where the data lines and the redundancy scan line cross over. Moreover, the present invention may further comprise a switching circuit connected between the redundancy scan line and one of the scan lines, and when the display panel enters a compensation mode, the switching circuit is turned on.

In one embodiment of the present invention, the switching circuit may comprise a switching transistor comprising a gate terminal for receiving the test signal, a first source/drain terminal connected to the redundancy scan line, and a second source/drain terminal connected to one of the scan lines. In another embodiment of the present invention, the switching circuit may be further connected to the scan lines connected to the redundancy pixel circuit via a multiplexer.

According to another embodiment of the present invention, a display panel is provided. The display panel may comprise, for example, a plurality of scan lines disposed parallel to each other in a first direction; at least one redundancy scan line disposed parallel to the scan lines; a plurality of data lines disposed parallel to each other in a second direction crossing over the redundancy scan line and the scan lines; a plurality of display pixel circuits disposed at a plurality of points where the data lines and the scan lines cross over, wherein whether or not to turn on the display pixel circuits is decided by the scan signal; and a plurality of redundancy pixel circuits disposed at a plurality of cross over points of the data lines and the redundancy scan line. Moreover, the present invention may further comprise a plurality of switching circuits for connecting all the scan lines to the redundancy scan line respectively, and when the display panel enters a compensation mode, the switching circuits may be turned on by turns.

According to still another embodiment of the present invention, a display device comprising a display panel, a gate driver circuit and a source driver circuit is provided. The display panel may comprise a plurality of display pixel cells and a plurality of redundancy pixel cells. The gate driver circuit and the source driver circuit may be connected to the display panel via a plurality of scan lines and data lines respectively. In the display panel, the display pixel cells may be disposed at the points where the data lines and a portion of the scan lines, and the redundancy pixel cells may be disposed at the points where the data lines and another portion of the scan lines without the display pixel cells cross over. In addition, the display device of the present invention may further comprise a timing control circuit, a plurality of current detection circuit and a programmable voltage generator. The timing control circuit may be connected to the gate driver circuit, the source driver circuit and the display panel via at least one redundancy scan line, and the redundancy pixel cells are disposed at a plurality of points where the redundancy scan line and the data lines cross over, when the display device enters a compensation mode, the timing control circuit turns on the redundancy pixel cells and a portion of the display pixel cells to compensate a plurality of currents of the display pixel cells. In addition, when the display device enters the compensation mode, each of the current detection circuits may be adopted for detecting one of the redundancy pixel cells and a working current of one of the display pixel cells to be compensated respectively, and a detection result is output to the timing control circuit. When the timing control circuit receives the detection result from the current detection circuit, it may control the programmable voltage generator to output a plurality of applicable data voltage signals to the source driver circuit to compensate each detected display pixel cell respectively according to the detection result generated from each current detection circuit.

In one embodiment of the present invention, the timing control circuit may comprise a driver circuit control unit, an image quality compensation unit and an interface unit. The driver circuit control unit may be adopted for controlling the source driver circuit and the gate driver circuit to drive the display panel to output an image according to a video data and a synchronization signal respectively. The image quality compensation unit may be connected to the driver circuit control unit, the source driver circuit and the display panel, and is adopted for receiving an output of the current detection circuit, when the display device enters the compensation mode, the image quality compensation unit turns on the redundancy pixel cell and a portion of the display pixel cells. Moreover, the image quality compensation unit controls the programmable voltage generator to output the data voltage signal via the interface processing circuit according to the output of the current detection circuit.

In one embodiment of the present invention, the current detection circuit may comprise a subtractor, a current-to-voltage converter and an analog-to-digital converter. The subtractor may be adopted for subtracting a working current of one of the redundancy pixel cells to the working current of one of the display pixel cells, and generating a current difference. The current-to-voltage converter receives and converts the current difference into a voltage type difference. The analog-to-digital converter receives and converts the output from the current-to-voltage into a compensate signal, and outputting to the timing control circuit.

According to one embodiment of the present invention, a compensation method of a display device comprising a plurality of pixel cells divided into a plurality of detection regions according to the positions of the display cells is provided. The compensation method may comprise the following steps. First, one of the detection regions is activated to a compensation mode. Then, a working current of each of the pixel cells in the one of the detection regions entering the compensation mode may be compared with a reference current to generate a plurality of comparison results. Then, a voltage level of a data received by each of the pixel cells in the one of the detection regions entering the compensation mode may be corrected according to the comparison result.

In one embodiment of the present invention, the method of entering the compensation mode comprises the following steps. When a display area enters the compensation mode, the display device may generate a plurality of data voltages representing totally white data to the pixel cells in one of the detection regions. Thereafter, a select signal may be generated to obtain a working current of the pixel cells in the detection region entering the compensation mode.

Accordingly, since the present invention provides a plurality of redundancy pixel cells for comparing the working current of the display pixel cells to the standard reference current, the shift of the working current of the display pixel cells may be readily detected. Moreover, the present invention also provides a programmable voltage generator. Thus, when the shift of the working current of each display pixel cell is detected, the timing controller of the present invention may adjust the programmable voltage generator to generate a voltage level of the data to compensate the display pixel cell. Thus, the brightness of the frame may be steady even after a period of time.

One or part or all of these and other features and advantages of the present invention will become readily apparent to those skilled in this art from the following description wherein there is shown and described one embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
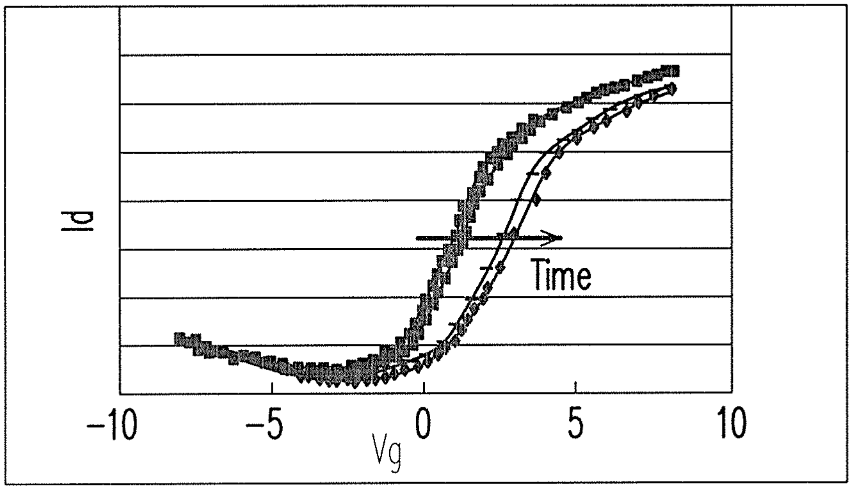
FIG. 1A (PRIOR ART)
FIG. 1A is a plot illustrating the drain current and gate voltage versus time of conventional a-Si TFT.
Figure 1B:
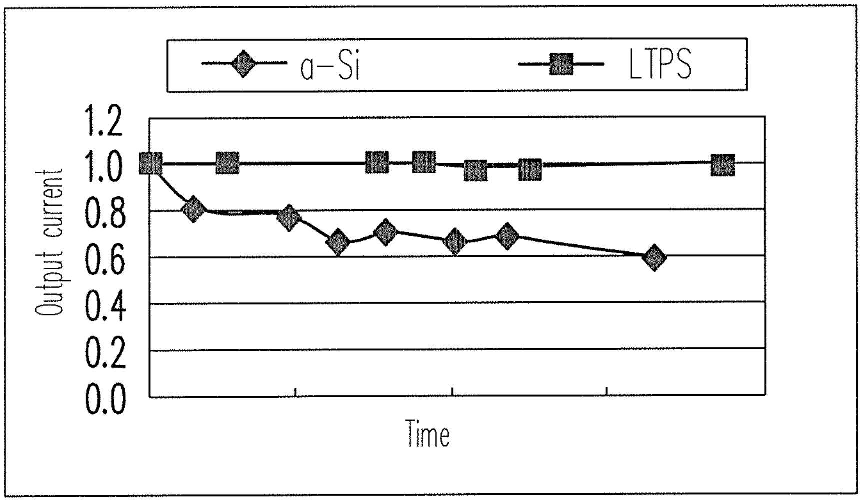
FIG. 1B (PRIOR ART)
FIG. 1B and FIG. 1C are plots illustrating the comparison of properties between a-Si TFT and LTPS TFT.
Figure 1C:
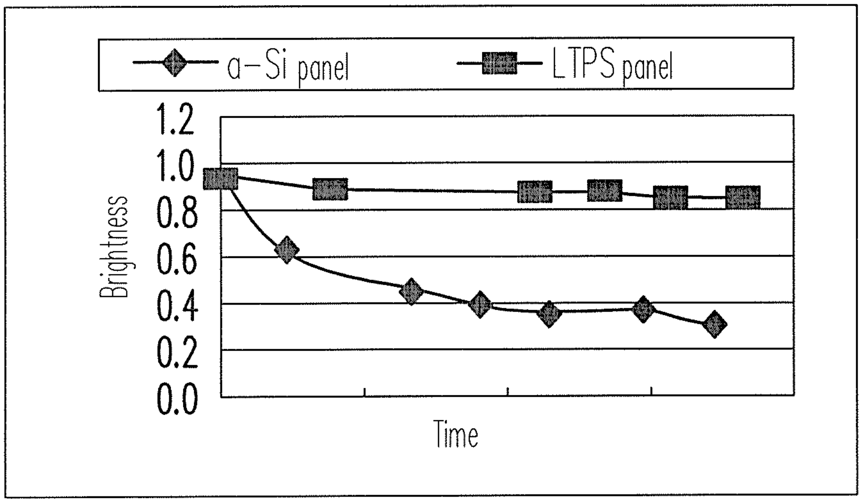
FIG. 1C (PRIOR ART)
Figure 2A:
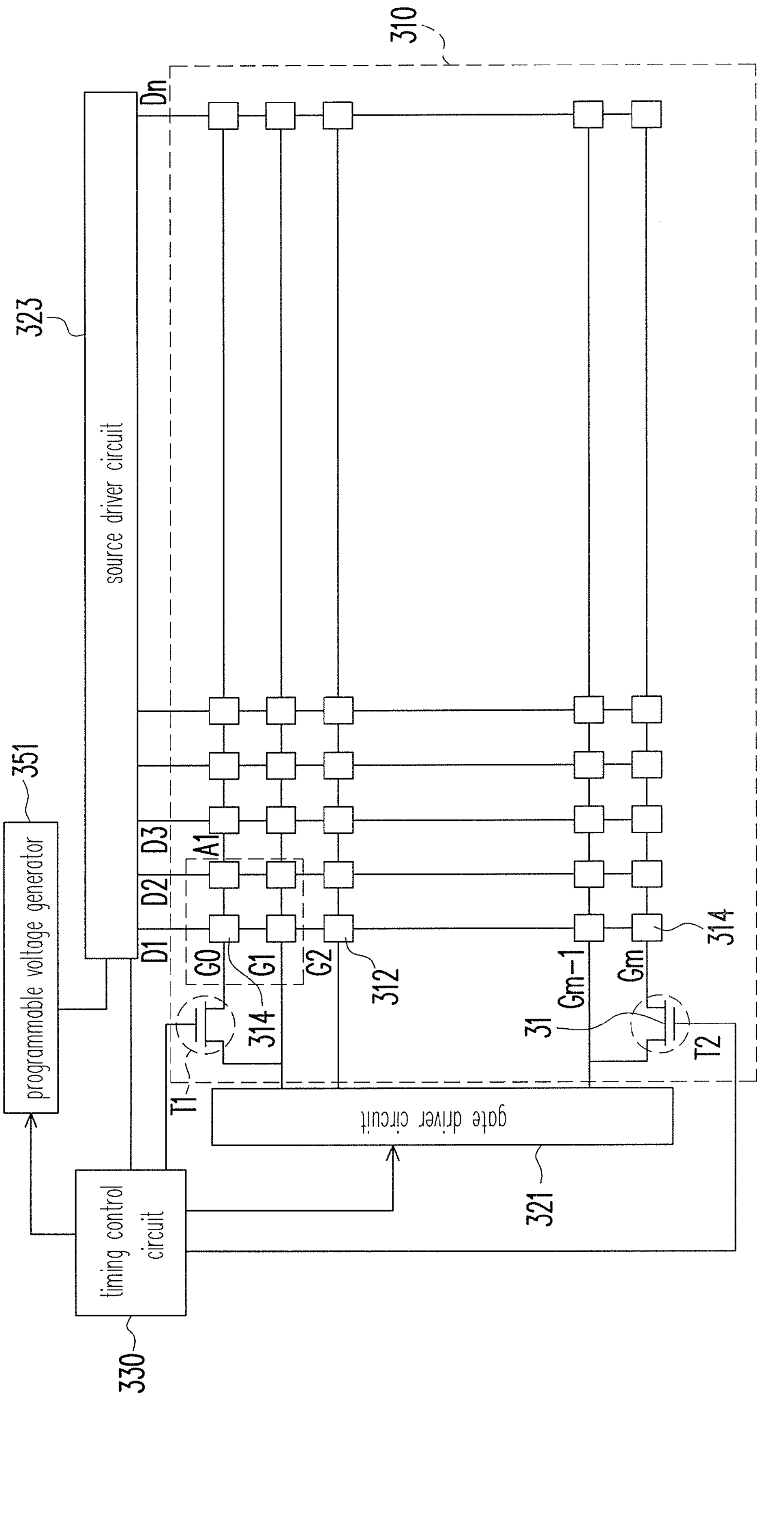
FIG. 2A is a schematic circuit block diagram of a display device according to one embodiment of the present invention.

FIG. 2A is a schematic circuit block diagram of a display device according to one embodiment of the present invention. Referring to FIG. 2A, the display device of the present invention may comprise a display panel 310 connected to a gate driver circuit 321 and a source driver circuit 323 via scan lines G1 to Gm−1 and data lines D1 to Dn respectively. In addition, the present invention may further comprise a timing control circuit 330 adopted for controlling the gate driver circuit 321 and the source driver circuit 323 to drive the display panel 310 to output image. Moreover, in another embodiment of the present invention, the display panel 310 may include a redundancy scan line. For example, the redundancy scan line may be disposed peripheral to the scan lines G1 to Gm−1, i.e., the scan lines G0 and Gm as shown in FIG. 2A. Optionally, the present invention may further comprise a programmable voltage generator 351 that may be adopted for generating a plurality of data voltages under the control of the timing control circuit 330. In addition, the data voltages may be input to the display panel 310 via the source driver circuit 323. For example, m and n described above may comprise a positive integer.

In the display panel 310, the scan lines G1 to Gm−1 and the redundancy scan lines G0 and Gm are arranged parallel to each other in a first direction, and the data lines D1 to Dn are arranged parallel to each other in a second direction, and are arranged crossing over the scan lines G1 to Gm−1 and redundancy scan lines G0 and Gm. In one embodiment of the present invention, the first direction and the second direction may be substantially perpendicular to each other. In addition, display pixel cell 312 may be disposed at the point where each of data lines D1 to Dn and each of scan lines G1 to Gm−1 cross over. In addition, redundancy pixel cell 314 may be disposed at the point where each of data lines D1 to Dn and each of redundancy scan lines G0 and Gm cross over.

Moreover, in one embodiment, scan line G1 may be connected to the redundancy scan line G0 via the switching circuit T1, and the scan line Gm−1 may be connected to the redundancy scan line Gm via the switching circuit T2, wherein whether or not to turn on the switching circuit T1 or T2 is controlled by the timing control circuit 330.

Figure 2B:
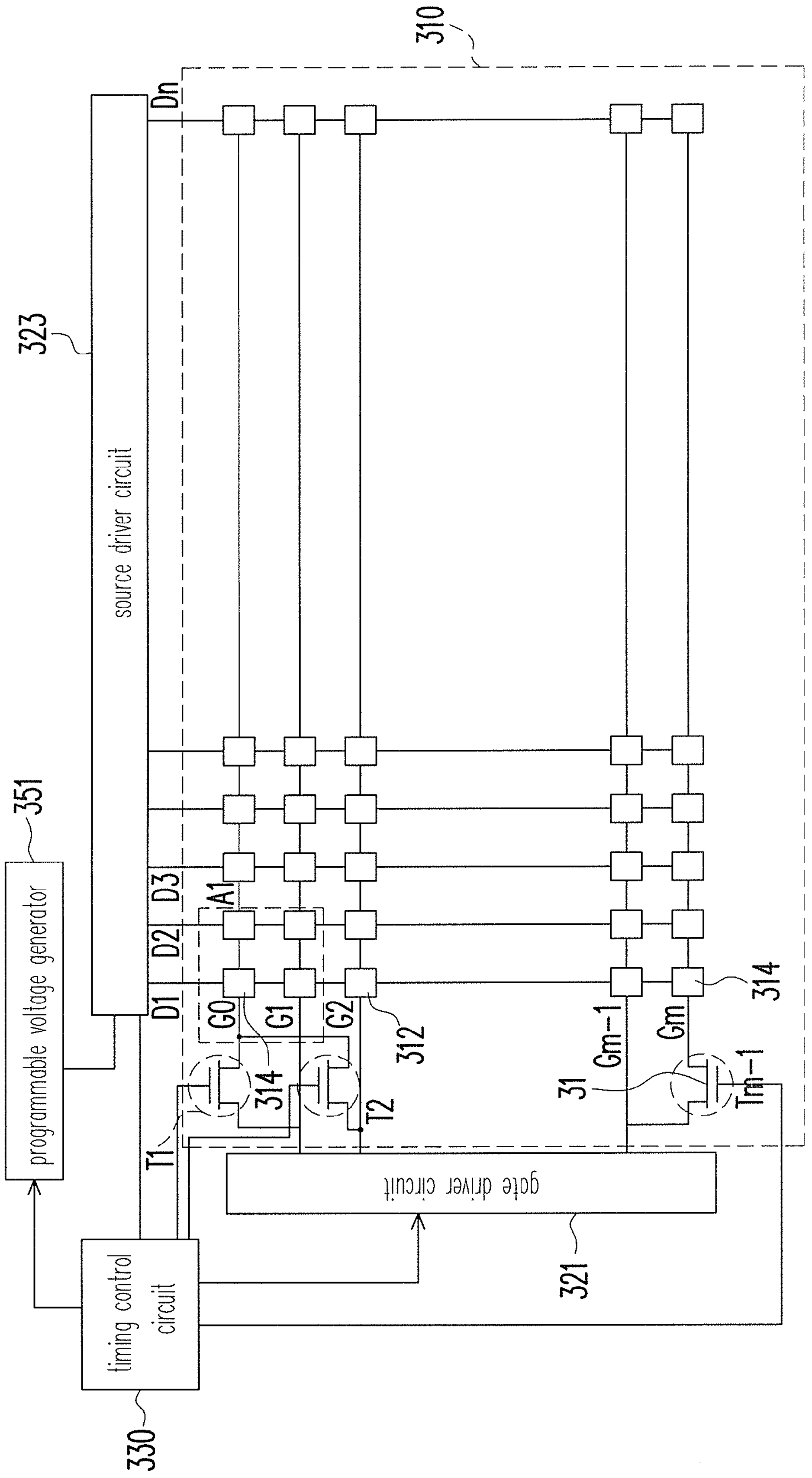
FIG. 2B is a schematic circuit block diagram of a display device according to another embodiment of the present invention.

FIG. 2B is a schematic circuit block diagram of a display device according to another embodiment of the present invention. Referring to FIG. 2B, in another optional embodiment, each of the scan lines G1 to Gm−1 may be connected to the redundancy scan lines G0 and Gm via one of the corresponding switching circuits T1 to Tm−1 respectively. In addition, the switching circuits (e.g., switching circuit T1) closer to the redundancy scan line G0 may be referred as a first switch set, and the other switching circuits closer to the redundancy scan line Gm−1 may be referred as a second switch set. In one embodiment of the present invention, the number of the switches of the first and the second switch sets may be closer to each other or the same.

In one embodiment of the present invention, about half of the scan lines may be connected to redundancy scan line G0 via a corresponding switching circuit, and the other scan lines may be connected to the redundancy scan line Gm via another corresponding switching circuit. To turn on the switching circuits T1 to Tm−1 or not may be decided by the timing control circuit 330. For example, when display panel 310 enters a compensation mode, the timing control circuit 330 may turn on the switching circuits T1 to Tm−1 by turns. In the present embodiment, each of switching circuits T1 to Tm−1 may comprise switching transistor 31 respectively. In addition, the first source/drain terminal of the switching transistor 31 may be connected to a corresponding scan line, and the second source/drain terminal of the switching transistor 31 may be connected to the redundancy scan line (e.g., redundancy scan line G0 or Gm), and the gate terminal of the switching transistor 31 may be connected to the timing control circuit 330.

In one embodiment of the present invention, display pixel cell 312 may comprise a conventional pixel cell. The timing control circuit 330 may be adopted for driving the display pixel cell 312 by controlling the gate driver circuit and source driver circuit. Thus, the display panel 310 may output image. However, the redundancy pixel cell 314 may not be turned on as the display panel 310 is normally operated. As the display panel 310 enters the compensation mode, the timing control circuit 330 may generate a test signal to enable one of the switching circuits, thus, the redundancy pixel cell 314 may be turned on by a scan signal received by the scan line of the display pixel cell 312.

In another optional embodiment, each of switching circuits T1 to Tm−1 may be connected to the scan line connected with redundancy pixel cell 314 via multiplexer.

Figure 4:
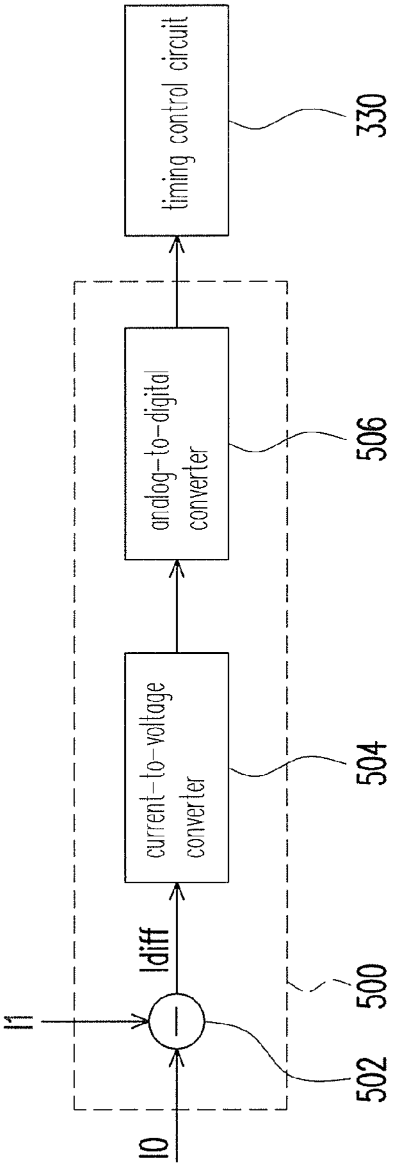
FIG. 4 is a schematic circuit block diagram of a current detection circuit according to one embodiment of the present invention.

Moreover, in the present invention, each display pixel cell 312 may also be connected to a current detection circuit (as shown in FIG. 4). When the timing control circuit 330 enables one of the switching circuits, the display pixel cell 312 connected to the switching circuit via the scan line may output a working current to the corresponding current detection circuit. The current detection circuit may compare the working current output from the corresponding display pixel cell 312 with the working current of the redundancy pixel cell 314 connected to the same data line. In addition, the timing control circuit 330 may control the programmable voltage generator 351 according to the comparison result of the working current to adjust the voltage level of the data received by each display pixel cell 314. Thus, the working current of each display pixel cell 314 may be steady. Therefore, the brightness of the image output by the display panel 310 may be steady.

In another embodiment of the present invention, a plurality of display pixel cells 312 may share a current detection circuit. Referring to FIG. 2B, about half of the display pixel cells 312 connected to the same data line may share a current detection circuit. In addition, a redundancy pixel cell 314 may be adopted for detecting the half of the display pixel cells 312 connected to the same data line.

Figure 3:
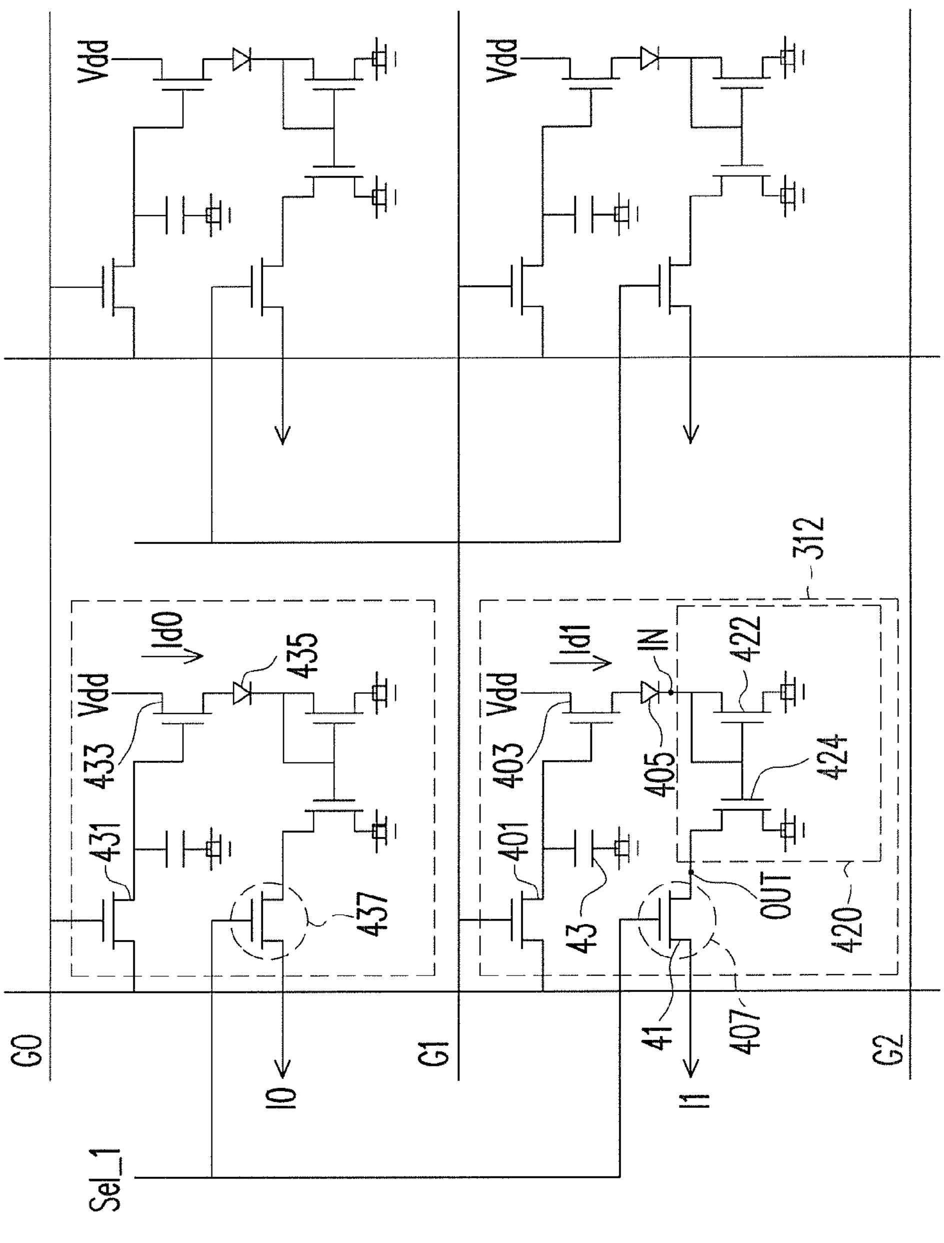
FIG. 3 is a schematic circuit diagram of display pixel cell and redundancy pixel cell according to one embodiment of the present invention.

FIG. 3 is a schematic circuit diagram of display pixel cell and redundancy pixel cell according to one embodiment of the present invention. Referring to FIG. 3, the redundancy pixel cell 314 and the display pixel cell 312 disposed at the cross over points of the data line D1 with the redundancy scan line G0 and the scan line G1 respectively are illustrated for description. In addition, the structure or circuit of the other redundancy pixel cell and display pixel cell are similar to or same as the redundancy pixel cell 314 and the display pixel cell 312 respectively.

The display pixel cell 312 at the point where the data line D1 and the scan line G1 cross over may comprise transistors 401 and 403. The gate terminal and the drain terminal of the transistor 401 may be connected to a corresponding scan line (G1) and data line (D1) respectively, and the source terminal of the transistor 401 may be connected to the gate terminal of the transistor 403 and grounded via capacitor 43. Moreover, the drain terminal and the source terminal of the transistor 403 may be connected to power Vdd and to current input terminal IN of current mirror module 420 via the pixel device 405. Since the current mirror module 420 is connected to the source terminal of the transistor 403 via the pixel device 405, the current mirror module 420 may duplicate the current Id1 through the pixel device 405 to the current output terminal OUT. In addition, a switching device 407 may be further connected to the current output terminal OUT of the current mirror module 420. Whether or not to turn on the switching device 407 may be decided by, for example but not limited to, the select signal Sel_1 generated by the timing control circuit 330 shown in FIG. 2A or 2B. In one embodiment of the present invention, the pixel device 405 may comprise organic light emitting diode (OLED).

In one embodiment of the present invention, the transistors 401 and 403 may comprise amorphous silicon thin film transistor (a-Si TFT).

In addition, the current mirror module 420 may comprise, for example, transistors 422 and 424. The drain terminal of the transistor 422 may be connected to the current input terminal IN, i.e., the drain terminal of the transistor 422 may represent the current input terminal IN of the current mirror module 420. The source terminal of the transistor 422 may be grounded, and the gate terminal of the transistor 424 may be connected to the drain terminal and gate terminal of the transistor 422 respectively. The drain terminal and source terminal of the transistor 424 may be connected to the current output terminal OUT of the current mirror module 420 and be grounded respectively.

In one embodiment of the present invention, the switching device 407 may be performed by the switching transistor 41. The gate terminal of the switching transistor 41 may receive the select signal Sel_1, and the drain terminal of the switching transistor 41 may be connected to the current output terminal OUT of the current mirror module 420. Thus, whether or not to turn on the source terminal and drain terminal of the switching transistor 41 may be decided by the select signal Sel_1.

In one embodiment of the present invention, the structure or circuit of the redundancy pixel cell 314 may be similar or same as the display pixel cell 312.

In one embodiment of the present invention, when the display pixel cell 312 at the point where the data line D1 and the scan line G1 cross over has to be detected and compensated by, for example, the timing control circuit 330 as shown in FIG. 2A or 2B enables switching circuit T1. Then, the gate driver circuit 321 outputs a scan signal to turn on the redundancy pixel cell 314 on the redundancy scan line G0 and the display pixel cell 312 on the scan line G1. Then, the timing control circuit 330 generates the select signal Sel_1 to enable the switching devices 407 and 437 to detect the working current through the pixel devices 405 and 435 simultaneously.

In one embodiment of the present invention, the compensation of the display pixel cell 312 is, for example, dependent on the current through each components of the display pixel cell 312. For example, the current through the pixel device 405 is the drain current Id1 of the transistor 403. In addition, the drain current Id1 of the transistor 403 may be calculated by the following equation:

$$Id1 = \frac{1}{2}\mu C_{ox}(W/L)(V_{gs} - V_{th})^2$$

Wherein, μ represents carrier mobility, $C_{ox}$ represents the depletion area capacitance of the transistor 403, W/L represents the ratio of the channel width and length of the transistor 403, $V_{gs}$ and $V_{th}$ represent the gate-to-source voltage and critical voltage of the transistor 403.

In one embodiment of the present invention, the drop of the drain current Id1 of the a-Si TFT 403 after working a period of time may be caused by the shift of the critical voltage $V_{th}$. It is noted that, after the a-Si TFT 403 works for a period of time, the critical voltage $V_{th}$ thereof will rise, thus the drain current Id1 will drop. Therefore, in one embodiment of the present invention, the voltage level of the data to the transistor 401 may be rise according to the shift of the critical voltage $V_{th}$ of the transistor 403. Thus, the gate-to-source voltage $V_{gs}$ of the transistor 403 rises to keep the drain current Id1 of the transistor 403 steady. Hereinafter, the method of adjusting the gate-to-source voltage $V_{gs}$ will be described in detail.

In one embodiment of the present invention, the display pixel cells on two scan lines may be compensated simultaneously. For example, the redundancy pixel cell 314 connected to the redundancy scan lines G0 and Gm may be provided for compensating the display pixel cells 312 connected to the same scan line at the same time.

FIG. 4 is a schematic circuit block diagram of a current detection circuit according to one embodiment of the present invention. It is noted that, only the redundancy pixel cell 314 and the display pixel cell 312 at the points where the data line D1 cross over with the redundancy scan line G0 and the scan line G1 respectively as shown in FIG. 3 are illustrated in FIG. 4. The currents I1 and I0 output from the switching circuits 407 and 437 as shown in FIG. 3 may be input to the current detection circuit 500. In the current detection circuit 500, the current I0 minus the current I1 by the subtractor 502, and a current difference Idiff may be obtained. In addition, since the currents I0 and I1 are obtained by duplicating the currents Id0 and Id1 through the pixel devices 435 and 405 respectively. Therefore, the currents I0 and Id0 are almost equal, and the current I1 and Id1 are almost equal.

In one embodiment of the present invention, the pixel devices 405 and 435 may comprise organic light emitting diode (OLED). In addition, the transistors 401, 403, 431 and 433 may comprise a-Si TFT. Therefore, after the pixel device 405 works for a period of time, the critical voltage of the a-Si TFT 403 rises as described above. Thus, the current Id1 for driving the pixel device 405, i.e., the drain current of the transistor 403 may drop. At this moment, for example, the timing control circuit 330 shown in FIG. 2A or 2B turns on the redundancy pixel 314. It is noted that, since the transistor 433 does not work before the drain current of the transistor 403 drops, and the structures of the transistors 433 and 403 are substantially similar or the same. Therefore, the shift of the drain current Id1 of the transistor 403 after working for a period of time may be substantially equal to the drain current Id0 of the transistor 433 minus the drain current Id1 of the transistor 403. Thus, in one embodiment of the present invention, the current I0 minus the current I1 is calculated by the subtractor 502.

After the current I0 minus the current I1 calculated by the subtractor 502 and the current difference Idiff representing the shift of the drain current Id1 of the transistor 403 after working a period of time are obtained. Thereafter, the current-to-voltage converter 504 converts the current difference Idiff into a voltage and input to the analog-to-digital converter 506. The analog-to-digital converter 506 outputs a compensate signal to the timing control circuit 330 according to the output of the current-to-voltage converter 504.

Figure 5:
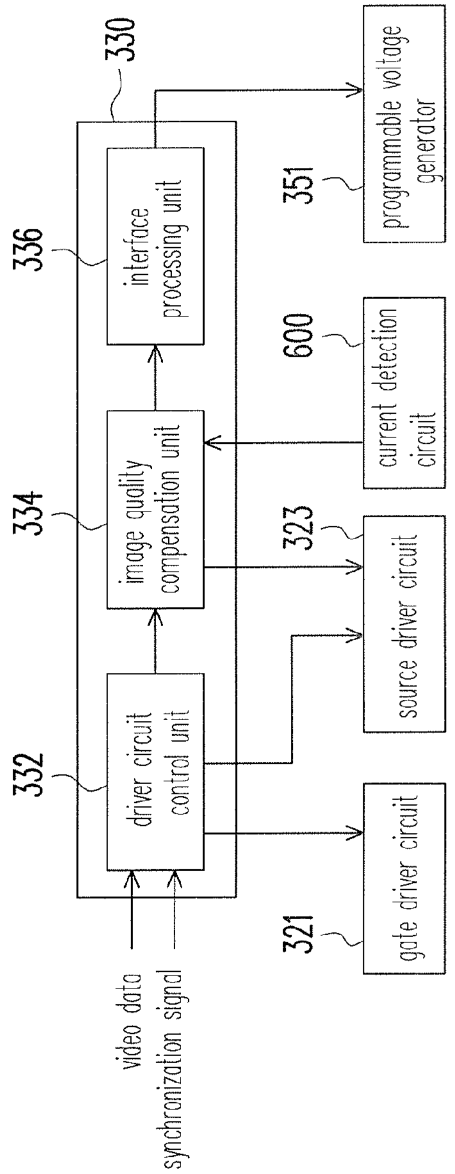
FIG. 5 is a schematic circuit block diagram of a timing control circuit according to one embodiment of the present invention.

FIG. 5 is a schematic circuit block diagram of a timing control circuit according to one embodiment of the present invention. Referring to FIG. 5, in the timing control circuit 330, the driver circuit control unit 332 controls the gate driver circuit 321 and the source driver circuit 323 to drive the display panel 310 shown in FIG. 2A or 2B to output image according to a video data and a synchronization signal. The image quality compensation unit 334 may be connected to the driver circuit control unit 332, and may be adopted for detecting the working condition of each display pixel cell 312 via a plurality of current detection circuits 600. In addition, the structure of each detection circuit 600 may be similar to or same as the current detection circuit 500 shown in FIG. 4. Therefore, the image quality compensation unit 334 controls the source driver circuit 323 according to the working condition of each display pixel cell 312, and controls the programmable voltage generator 351 to output applicable data voltage to the source driver circuit 323 via interface processing unit 336. Thus, the brightness of the frame displayed by the display panel 310 may be steady.

Figure 6:
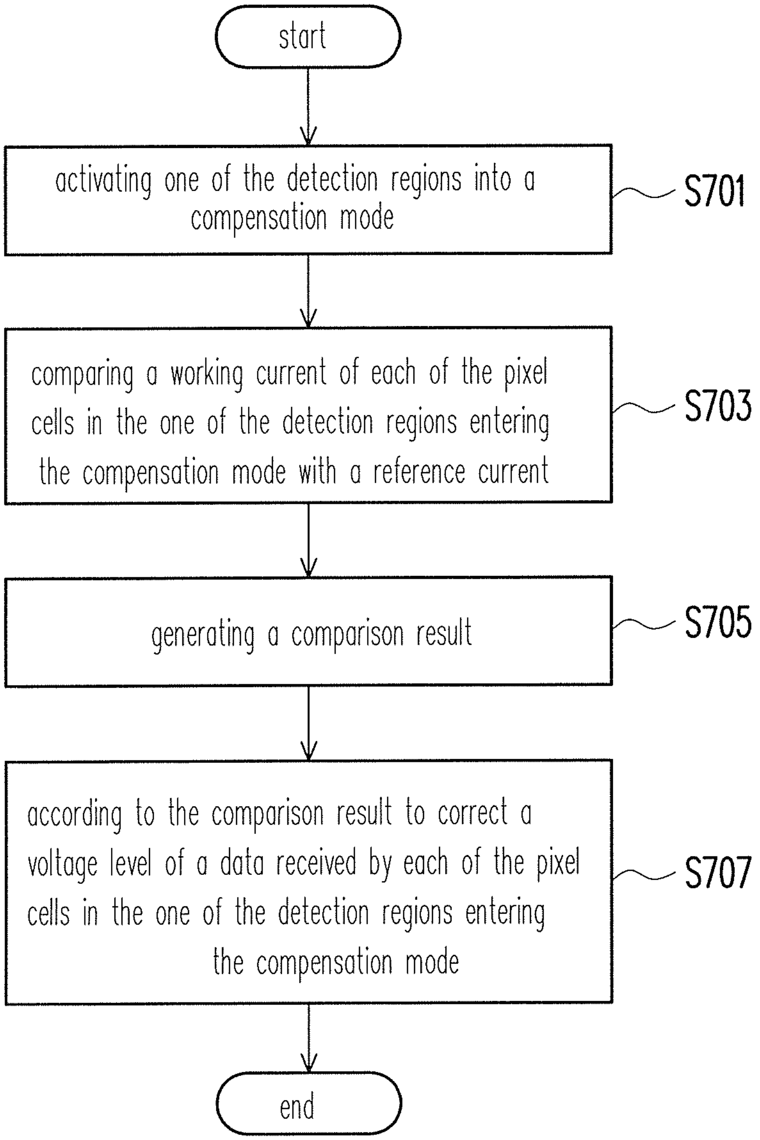
FIG. 6 is a process flowchart illustrating a compensation method of a display device according to one embodiment of the present invention.

FIG. 6 is a process flowchart illustrating a compensation method of a display device according to one embodiment of the present invention. Referring to FIG. 6, the display device using the compensation method of the present invention may comprise, for example, the display device shown in FIGS. 2A and 2B. Since the display device shown in FIG. 2A or 2B only comprises a redundancy pixel cell 314 disposed on the redundancy scan lines G0 and Gm, the detection and compensation of the display pixel cells 312 have to be divided in batches and performed in turn. Accordingly, the display pixel cells 312 may be divided into a plurality of detection regions according to, for example, the position of the display pixel cell 312 (for example but not limited to, the region A1 marked by the dotted line shown in FIGS. 2A and 2B) for detection and compensation.

When the display pixel cell 312 shown in FIGS. 2A and 2B has to be detected and compensated, at step S701, the timing control circuit 330 enables a detection region entering a compensation mode. In one embodiment of the present invention, the step of the timing control circuit 330 enabling the detection region entering the compensation mode may comprise, for example, input a data voltage representing totally white data to all the display pixel cell 312 and the detection pixel cell 314 in the detection region. Then, a select signal (e.g., the signal Sel_1 as shown in FIG. 3) to the display pixel cell 312 and the detection pixel cell 314 to enable the switching device inside (e.g., as shown in FIG. 3).

After the detection region enters the compensation mode, at step S703, the working current of the pixel device (for example but not limited to, the pixel devices 405 and 435 shown in FIG. 3) in each display pixel cell 312 and detection pixel cell 314 in the detection region may be input to the current detector 500 as shown in FIG. 4 for comparison. Thereafter, at step S705, the current detector 500 generates a comparison result to, for example but not limited to, the pixel compensation unit 334 shown in FIG. 5. At this moment, at step S707, the pixel compensation unit 334 controls the programmable voltage generator 351 according to the comparison result via the interface processing unit 336 to correct the voltage level of the data of the display pixel cells 312 in the detection region from the programmable voltage generator 351. Accordingly, the timing control circuit 330 detects the display pixel cells in the detection regions by turns according to the steps shown in FIG. 6, and compensates according to the working condition.

Accordingly, the present invention has at least the following advantages. First, the pixel circuit of the present invention comprises a current mirror module and a switching device for detecting and comparing the current through the pixel device to compensate the other transistors. In addition, the display panel of the present invention includes redundancy pixel cell and display pixel cell, wherein the redundancy pixel cell is not worked during the normal operation of the display panel. Therefore, the working current of the redundancy pixel cell of the present invention may be used as a reference current to calculate the shift of the working current of the display pixel cell after the display pixel cell works for a period of time and to compensate the working current according to the shift.

Moreover, the display device of the present invention may comprise a programmable voltage generator. Therefore, when the image quality compensation unit in the timing control circuit detects the shift of the working current of each display pixel cell via the current detection circuit, the control programmable voltage generator may be controlled to output applicable data voltage to compensate the shift of the working current of the display pixel cell. Furthermore, the compensation method of the display device of the present invention may compare the working current in each pixel cell to a reference current, and correct the voltage level of data received by each pixel cell according to the comparison result. Therefore, the working current of each pixel cell may be steady.

The foregoing description of the embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, comprising:

a display panel, comprising a plurality of display pixel cells and a plurality of redundancy pixel cells;

a gate driver circuit, connected to the display panel via a plurality of scan lines;

a source driver circuit, connected to the display panel via a plurality of data lines, wherein a first display pixel cell of the display pixel cells is connected to a first data line of the data lines and a first scan line of the scan lines, a first redundancy pixel cell of the redundancy pixel cells is connected to the first data line and a redundancy scan line;

a timing control circuit, connected to the gate driver circuit, the source driver circuit and the display panel, for controlling operations of the gate driver circuit and the source driver circuit to drive the display panel, wherein when the display device enters a compensation mode, the timing control circuit controls the gate driver circuit to generate a first scan signal to the first scan line and the redundancy scan line, so as to simultaneously activate the first display pixel cell and the first redundancy pixel cell;

at least one current detection circuit, connected to the timing control circuit, the first display pixel cell and the first redundancy pixel cell, for simultaneously detecting working currents respectively outputted from the first display pixel cell and the first redundancy pixel cell in response to a select signal from the timing control circuit when the display device enters the compensation mode, and then detecting a difference between the working currents respectively corresponding to the first display pixel cell and the first redundancy pixel cell, so as to output a detection result relating to the difference to the timing control circuit; and a programmable voltage generator, connected to the timing control circuit and the source driver circuit, wherein the timing control circuit controls the programmable voltage generator to output a plurality of programmable data voltage signals to the source driver circuit according to the detection result, so as to compensate the working current corresponding to the first display pixel cell and steady the working current corresponding to the first display pixel cell.

2. The display device of claim 1, wherein the timing control circuit comprises:

a driver circuit control unit, for controlling the source driver circuit and the gate driver circuit to drive the display panel to output an image according to a video data and a synchronization signal respectively;

an image quality compensation unit, connected to the driver circuit control unit, the source driver circuit and the display panel, and adopted for receiving an output of the current detection circuit, wherein when the display device enters the compensation mode, the image quality compensation unit turns on or activates the first redundancy pixel cell and the first display pixel cell; and an interface unit, connected to the image quality compensation unit and the programmable voltage generator, wherein the image quality compensation unit controls the programmable voltage generator to output the data voltage signals via the interface processing circuit according to the output of the current detection circuit.

3. The display device of claim 1, wherein the current detection circuit comprises:

a subtractor, for subtracting the working current corresponding to the redundancy pixel cell to the working current corresponding to the display pixel cell, so as to generate the difference;

a current-to-voltage converter, for converting the difference into a voltage type difference; and an analog-to-digital converter, for converting an output of the current-to-voltage into a compensate signal as the detection result, and outputting to the timing control circuit.

4. The display device of claim 1, wherein the display panel comprises at least a switch connected to the first redundancy scan line and the first scan line, and wherein when the display panel enters the compensation mode, the first redundancy scan line and the first scan line are conducted to each other for simultaneously receiving the first scan signal.

5. The display device of claim 1, wherein the working current corresponding to the first display pixel cell does not compensate when the display device is normally operated.

6. The display device of claim 1, wherein the first display pixel cell comprises a first current mirror configured for mirroring and providing, when the display device enters the compensation mode, the working current corresponding to the first display pixel cell to the detection circuit in response to the select signal; and the first redundancy pixel cell comprises a second current mirror configured for mirroring and providing, when the display device enters the compensation mode, the working current corresponding to the first redundancy pixel cell to the detection circuit in response to the select signal.

7. A compensation method of a display device comprising at least one display pixel cell, at least one redundancy pixel cell, at least one scan line, at least one data line and at least one redundancy scan line, wherein the display pixel cell is connected to the data line and the scan line, and the redundancy pixel cell is connected to the data line and the redundancy scan line, the compensation method comprising:

generating, when the display device enters a compensation mode, a scan signal to the scan line and the redundancy scan line, so as to simultaneously activate the display pixel cell and the redundancy pixel cell;

detecting, when the display device enters the compensation mode, working currents respectively outputted from the display pixel cell and the redundancy pixel cell simultaneously and a difference between the working currents respectively corresponding to the display pixel cell and the redundancy pixel cell, so as to output a detection result relating to the difference; and compensating the working current corresponding to the display pixel cell according to the detection result, so as to steady the working current corresponding to the display pixel cell.

8. The compensation method of claim 7, wherein the working current corresponding to the display pixel cell does not compensate when the display device is normally operated.

9. A display device, comprising:

a display panel comprising a plurality of display pixel cells and a plurality of redundancy pixel cells;

a gate driver circuit electrically connected to the display panel via a plurality of scan lines;

a source driver circuit electrically connected to the display panel via a plurality of data lines, wherein a first display pixel cell of the display pixel cells is connected to a first data line of the data lines and a first scan line of the scan lines, and a first redundancy pixel cell of the redundancy pixel cells is connected to the first data line and a redundancy scan line;

a timing control circuit electrically connected to the gate driver circuit, the source driver circuit and the display panel, for simultaneously activating the first display pixel cell and the first redundancy pixel cell;

at least one current detection circuit, electrically connected to the timing control circuit, the first display pixel cell and the first redundancy pixel cell, for simultaneously detecting a first working current outputted from the first display pixel cell and a second working current outputted from the first redundancy pixel cell and obtaining a difference between the first working current and the second working current, so as to output a detection result relating to the difference to the timing control circuit; and a programmable voltage generator, electrically connected to the timing control circuit and the source driver circuit, wherein the timing control circuit controls the programmable voltage generator to output a plurality of programmable data voltage signals to the source driver circuit according to the detection result to compensate the first working current.

* * * * *